United States Patent [19]

Gaylord

[11] 4,126,738

[45] Nov. 21, 1978

[54] COPOLYMERS OF 5-NORBORNENE 2,3-DICARBOXYLIC ANHYDRIDE AND MALEIC ANHYDRIDE

[75] Inventor: Norman G. Gaylord, New Providence, N.J.

[73] Assignee: Borg-Warner Corporation, Chicago, Ill.

[21] Appl. No.: 783,997

[22] Filed: Apr. 4, 1977

Related U.S. Application Data

[63] Continuation-in-part of Ser. No. 658,436, Feb. 17, 1976, abandoned.

[51] Int. Cl.$^2$ .................... C08F 220/08; C08F 234/00
[52] U.S. Cl. ........................... 526/271; 260/30.4 R; 260/32.8 R; 526/15; 526/227; 526/230
[58] Field of Search ..................... 526/271, 227, 230

[56] References Cited

U.S. PATENT DOCUMENTS

| | | | |
|---|---|---|---|
| 2,359,038 | 9/1944 | Hopff et al. | 260/78 |
| 3,838,113 | 9/1974 | Smallman | 260/78.5 |

OTHER PUBLICATIONS

J.A.C.S., Craig, 73, 4889, (1951).
J.A.C.S., Ganter et al., 87, 2771, (1965).
Tetrahedron Letters, Mironon et al., 5823, (1966).

*Primary Examiner*—Stanford M. Levin
*Attorney, Agent, or Firm*—Richard J. Schlott

[57] ABSTRACT

Novel copolymers of maleic anhydride and the endo and exo cyclic adducts of maleic anhydride and cyclic conjugated dienes such as cyclopentadiene. The copolymers are prepared by heating either of the cyclic adducts and maleic anhydride in the presence of a free radical precursor, such as a peroxygen compound, at a temperature at which endo-exo isomerization of the adduct occurs.

11 Claims, No Drawings

COPOLYMERS OF 5-NORBORNENE 2,3-DICARBOXYLIC ANHYDRIDE AND MALEIC ANHYDRIDE

CROSS REFERENCE TO RELATED APPLICATIONS

This application is a continuation-in-part of U.S. application Ser. No. 658,436, filed Feb. 17, 1976, now abandoned.

BACKGROUND OF THE INVENTION

This invention relates to novel copolymers of maleic anhydride and the cyclic adducts of maleic anhydride and certain conjugated dienes, and more particularly to novel copolymers of maleic anhydride and the cyclic adducts of maleic anhydride and cyclic conjugated dienes. This invention also pertains to a process for preparing such copolymers.

The reaction of maleic anhydride with cyclic conjugated dienes such as cyclopentadiene and the isomeric methylcyclopentadienes yields the equimolar cyclic Diels-Alder adducts, endo-cis-5-norbornene-2, 3-dicarboxylic anhydride and the 1-, 5- and 7-methyl substituted homologues, respectively. The endo maleic anhydride-cyclopentadiene adduct, m.p. 165° C., undergoes isomerization at elevated temperatures to the exo adduct, m.p. 143° C. the isomerization takes place in the melt (D. Craig, J. Amer. Chem. Soc., 73, 4889 (1951)) or in solution (C. Ganter, U. Scheidegger, and J. D. Roberts, J. Amer. Chem. Soc., 87, 2771 (1965)). When either isomer is heated at a sufficiently elevated temperature, isomerization occurs and a mixture of both isomers is obtained. When the heating period is extended the equilibrium composition for that temperature is established. The various endo maleic anhydride-methylcyclopentadiene adducts, prepared from the 1-, 2- and 5-methylcyclopentadienes, similarly undergo isomerization to a mixture of the exo and endo adducts at elevated temperatures (V. A. Mironov, T. M. Fadeeva, U. A. Stepaniatz, and A. A. Akhrem, Tetrahedron Letters, 5823 (1966).

One object of the present invention is to provide novel copolymers of maleic anhydride and the maleic anhydride-conjugated diene cyclic adducts.

Another object of the present invention is to provide novel copolymers of maleic anhydride and the cyclic adducts of maleic anhydride and cyclic conjugated dienes.

A further object of the present invention is to provide a process for preparing such novel copolymers.

These and other objects of the present invention will become apparent from the ensuing description and illustrative embodiments.

BRIEF SUMMARY OF THE INVENTION

In accordance with the present invention it has now been found that terpolymers of maleic anhydride and the exo and endo adducts can be obtained by subjecting maleic anhydride and either of the isomeric Diels-Alder adducts from maleic anhydride and cyclic conjugated dienes to temperatures at which isomerization occurs, in the presence of a free radical precursor.

DETAILED DESCRIPTION OF THE INVENTION

The cyclic adducts which are useful for preparing the novel terpolymers of this invention comprise the equimolar adducts from maleic anhydride and the cyclic conjugated dienes, cyclopentadiene and the isomeric methylcyclopentadienes. The exo and endo adducts as well as mixtures thereof are capable of undergoing polymerization to yield these novel copolymers by the process of the present invention.

The reaction may be carried out in bulk, i.e., in the molten state, or in the presence of an organic solvent which is inert towards the anhydride functionality of the adduct, i.e., a solvent which does not contain reactive hydrogen atoms such alcohols, mercaptans or amines.

The required free radical precursors may be conventional polymerization catalysts including azo compounds, dialkyl peroxides diacyl peroxides, peresters, hydroperoxides, etc., e.g. azobisisobutyronitrile, di-tert-butyl peroxide, dicumyl peroxide, benzoyl peroxide, tert-butyl peracetate, tert-butyl perbenzoate, tert-butyl hydroperoxide, etc. The free radical precursor is used in catalytic quantities, e.g. 0.01-10% by weight based on monomers, and preferably at temperatures where it has a relatively short half-life of no more than 2 hours.

The minimum reaction temperature employed in the preparation of the novel copolymers of the present invention is the temperature at which endo-exo isomerization occurs. In general, the temperature will range from 170° to 300° C., and preferably from about 190° to 300° C. Either atmospheric or superatmospheric pressures may be employed.

In accordance with one method of carrying out the present invention, the catalyst is added continuously or intermittently over a period of time, to the mixture of adduct and maleic anhydride which is being maintained at the desired reaction temperature. The catalyst may also be added as a solution in an inert solvent to the mixture or a solution thereof at the desired temperature. When the reaction medium is a solvent for the copolymer, the latter may be precipitated therefrom with a non-solvent. When the medium is a non-solvent for the copolymer, the latter is precipitated during the course of the reaction.

When the reaction of the adduct with maleic anhydride is carried out in bulk, the copolymer begins to precipitate from the reaction mixture shortly after the reaction is initiated by the addition of the catalyst. When the reaction is completed the mixture is diluted with acetone to dissolve the copolymer, which is then precipitated with chloroform. Other solvent - non-solvent compositions may be used to isolate the copolymer. The copolymer is soluble in methyl ethyl ketone and dioxane as well as acetone and is insoluble in carbon tetrachloride, chlorobenzene, carbon disulfide, hexane and benzene as well as chloroform. It will be understood that the exact method of recovering the copolymer from the reaction mixture is not a critical feature of this invention, and that any of the known procedures may be readily employed.

The reaction occurs rapidly during the period of catalyst addition and is virtually complete shortly thereafter. Although the reaction may be terminated by cooling at that time, the reaction mixture is generally heated for an additional period to ensure maximum conversion.

The molar ratio of maleic anhydride to maleic anhydride-cyclic conjugated diene cyclic adduct may range from 3:1 to 1:3 and preferably about 1:1.

Elemental, infrared and nuclear magnetic resonance analyses indicate that the novel copolymers of the present invention have essentially saturated structures derived from one mole of maleic anhydride and one mole of the cyclic adduct.

The infrared spectra of the maleic anhydride-5-norbornene-2, 3-dicarboxylic anhydride copolymers, prepared by copolymerization of maleic anhydride with either of the isomers of the cyclic adduct, recorded as films cast on sodium chloride plates from acetone solution, show absorption peaks at 1760 and 1835 cm$^{-1}$, characteristic of copolymers containing maleic anhydride. Strong peaks are present at 1220, 1080, 940 and 900 cm$^{-1}$. The absence of absorption peaks at 1640 and 3050 cm$^{-1}$ indicates the absence of double bonds. An absorption peak at 730 cm$^{-1}$, characteristic of unsaturated polymers derived from cyclopentene and cyclopentadiene and present in the spectra of the cyclic exo and endo adducts, cis-5-norbornene-2, 3-dicarboxylic anhydride, is virtually absent in the spectra of the copolymers of this invention, indicating the absence of any significant amount of unsaturation.

The NMR spectra of the maleic anhydride-5-norbornene-2, 3-dicarboxylic anhydride copolymers, measured at 60 MHz in acetone-$d_6$ using tetramethylsilane as internal standard, contain absorption peaks in the 5.5–9.3$\tau$ region. The spectra of copolymers of maleic anhydride and the endo adduct, prepared at temperatures below 170° C., contain significant peaks at 6.2–6.4$\tau$, 6.5–7.2$\tau$ and 8.2–9.1$\tau$. The absorption peak at 6.2–6.4$\tau$ is greatly decreased and essentially absent in the spectra of copolymers of maleic anhydride and the exo adduct prepared at temperatures below 170° C. However, the absorption peak at 6.2–6.4$\tau$ is present in the spectra of copolymers of maleic anhydride and either the exo or endo adduct prepared at temperatures above 170° C., i.e., temperatures where endo-exo isomerization of the adduct occurs and leads to the formation of polymers containing units derived from maleic anhydride, the endo adduct and the exo adduct.

The absence of absorption in the 4–5$\tau$ region of NMR spectra confirm the saturated structure of the copolymer. Integration of the NMR absorption peaks confirms the presence of one mole of the adduct, 5-norbornene-2, 3-dicarboxylic anhydride, and one mole of maleic anhydride.

The invention will be more fully understood by reference to the following illustrative embodiments.

EXAMPLE I

The Diels-Alder adduct from cyclopentadiene and maleic anhydride, endo-cis-5-norbornene-2, 3-dicarboxylic anhydride, m.p. 165° C., was heated at 220° C. for 4 hours. On cooling, the product solidified with a melting point of 101° C. The crude reaction product was recrystallized from benzene three times to isolate exo-cis-5-norbornene-2, 3-dicarboxylic anhydride, m.p. 141° C., in 25% yield.

EXAMPLE II endo-cis-5-Norbornene-2, 3-dicarboxylic anhydride, 2.50 g. (15 mmoles), and 1.50 g. (15 mmoles) maleic anhydride were charged into a test tube equipped with a rubber serum cap. The tube was placed in an oil bath maintained at 80° C. so that the contents were below the bath level. t-Butyl peroxypivalate, 0.35 ml. (1.2 mmoles) (75% in mineral spirits), was added by hypodermic syringe in four portions over a period of 20 min., following which the test tube was kept in the bath at 80° C. for an additional 40 min. The reaction mixture was cooled and the resultant solid was dissolved in acetone. The solution was poured into chloroform in order to precipitate the copolymer. The latter, after drying in vacuo at 40° C. for 15 hr., was obtained in a yield of 1.33 g. (33% based on equimolar copolymer). The copolymer was purified by solution in acetone and precipitation in chloroform. The copolymer was soluble in cold dioxane.

Elemental analyses indicated that the product was a 1:1 endo-adduct - maleic anhydride copolymer. Calculated for $C_{13}H_{10}O_6$: C, 59.5: H, 3.8. Found: C, 58.8; H, 4.9.

The NMR spectrum of the copolymer in acetone-$d_6$ at room temperature showed absorption in the 5.0–9.1$\tau$ region. A small peak at 4.2$\tau$ indicated the presence of a small amount of unsaturation, probably as an end group. Significant peaks were present at 6.15–6.4$\tau$, 6.6–7.2$\tau$, 8.1–8.3$\tau$ and 8.5–9.1$\tau$. Integration of the NMR absorption peaks confirmed the equimolar composition of the copolymer. The molecular weight of the copolymer, determined by vapor phase osometry in tetrahydrofuran, was 700. The copolymer had a softening point of 255°–260° C.

EXAMPLE III

In addition of 0.15 ml. (1 mmole) of t-butyl hydroperoxide-70 to a mixture of 1.64 g. (10 mmoles) of endo cyclopentadiene-maleic anhydride adduct and 0.98 g. (10 mmoles) of maleic anhydride at 205° C. was carried out in 4 portions over a period of 20 min. After an additional period of 40 min. at 205° C., the 1:1 adduct-maleic anhydride copolymer was isolated as described in Example II. The yield of copolymer was 1.14 g. (44%). The absorption peak at 6.15–6.4$\tau$ in the NMR spectrum, characteristic of copolymers prepared from the endo adduct and maleic anhydride, was present though smaller than the corresponding peak observed in the copolymer prepared in Example II, indicating the presence of units derived from both the endo and exo adducts.

EXAMPLE IV

The copolymerization of 2.50 g. (15 mmoles) of the endo adduct and 1.50 g. (15 mmoles) of maleic anhydride was carried out at 220° C. in the same manner as in Example II, adding 0.13 ml. (1.5 mmoles) of t-butyl hydroperoxide-90 in 4 portions over a period of 20 min., followed by an additional 40 min. at 220° C. The yield of dioxane-soluble 1:1 copolymer was 1.11 g. (28% based on total monomers). Elemental analyses: Calculated for $C_{13}H_{10}O_6$: C, 59.5: H, 3.8. Found: C. 60.2: H, 4.4.

EXAMPLE V

The copolymerization of 2.50 g. (15 mmoles) of the endo adduct and 0.64 g. (6.5 mmoles) of maleic anhydride was carried out at 220° C. in the same manner as in Example IV, using 0.07 ml. (0.8 mmole) of t-butyl hydroperoxide-90 as catalyst. The yield of dioxane-soluble 1:1 copolymer was 0.84 g. (27% based on total monomers, 49% calculated as the 1:1 copolymer). Elemental analyses: C, 60.3: H, 4.6.

EXAMPLE VI

The copolymerization of 2.50 g. (15 mmoles) of the endo cyclopentadiene-maleic anhydride adduct and 3.50 g. (36 mmoles) of maleic anhydride in the presence of 0.22 ml. (2.5 mmoles) of t-butyl hydroperoxide-90 was carried out at 220° C., in the same manner as in Example IV. The yield of dioxane-soluble 1:1 copolymer was 1.49 g. (25% based on total monomers, 37% based on 1:1 copolymer). The characteristic absorption at 6.1–7.3τ was present in the NMR spectrum of the copolymer.

EXAMPLE VII

The copolymerization of exo-cis-5-norbornene-2,3-dicarboxylic anhydride, 1.25 g. (7.6 mmoles), and 0.75 g. (7.6 mmoles) of maleic anhydride in the presence of 0.17 ml. (0.6 mmoles) of t-butyl peroxypivalate was carried out at 80° C., in the same manner as in Example II. The yield of dioxane-insoluble copolymer was 0.88 g. (44% based on total monomers). Elemental analyses indicated that the product was a 1:1 exo-adduct - maleic anhydride copolymer. Calcd. for $C_{13}H_{10}O_6$, C, 59.5: h, 3.8. Found: C, 59.9: H, 4.7. The NMR spectrum confirmed the presence of 1 unit derived from the adduct and 1 unit derived from maleic anhydride. A small peak at 4.2τ indicated the presence of a small amount of unsaturation while a broad peak at 8.5–8.84τ was due to the presence of a catalyst moiety. There was no absorption peak in the 6.2–6.4τ region. The copolymer had a molecular weight of 665, as determined by vapor phase osmometry in tetrahydrofuran.

EXAMPLE VIII

The procedure described in Example III was repeated with the addition of 0.15 ml. (1 mmole) of t-butyl hydroperoxide-70 to 1.64 g. exo adduct and 0.98 g. maleic anhydride at 205° C. The catalyst addition time of 20 min. was followed by another 40 min. at 205° C. The yield of 1:1 copolymer was 1.12 g. (43%). The NMR spectrum contained peaks centered at 6.25 and 6.4τ, indicating the presence of units derived from the endo adduct as well as the exo adduct.

EXAMPLE IX

The copolymerization of 1.25 g. (7.6 mmoles) of the exo cyclopentadiene-maleic anhydride adduct and 0.75 g. (7.6 mmoles) of maleic anhydride was carried out 220° C. by the addition of 0.06 ml. (0.7 mmole) of t-butyl hydroperoxide-90, in the same manner as in Example II. The yield of dioxane- soluble 1:1 copolymer was 0.67 g. (33% based on total monomers). Elemental analyses: C, 59.8: H, 4.4.

The novel polymers of this invention may be converted into numerous derivatives by any of the known reactions for organic compounds containing anhydride groups. Thus, for example, the polymers containing anhydride groups may be hydrolyzed to produce recurring units which are dicarboxylic acids and which in turn may be converted to mono- or dicarboxylic acid salts. The carboxylic acid groups may be esterified with monohydric alcohols or diazoalkanes to yield monoester acids or diesters, respectively. The anhydride groups may be reacted with monohydric alcohols to produce monoester acids or diesters, depending upon the relative amount of alcohol and the reaction conditions. The anhydride groups may also be reacted with amines to yield monoamide acids or diamides or imides and with ammonium hydroxide to produce the mono-or diammonium salts as well as the monoamide-monoammonium salt. Since the polymer contains numerous anhydride groups, by controlling the quantity of reagent it is possible to control the extent of reaction.

The novel polymers of the present invention may be employed as stabilizers, dispersants, emulsifiers, textile and paper sizing agents, leveling agents in floor polishes, etc.

The polyanhydrides or half acids may be utilized to cure epoxy, alkyd, amine-formaldehyde, thermosetting acrylic and other resins containing reactive functionality or may themselves be cured by agents containing such functionality.

While particular embodiments of this invention are shown above, it will be understood that the invention is obviously subject to variations and modifications without departing from its broader aspects.

What is claimed is:

1. A terpolymer of maleic anhydride and the exo and endo cyclic adducts of maleic anhydride and a cyclic conjugated diene, said diene selected from the group consisting of cyclopentadiene and methylcyclopentadiene, said terpolymer prepared by heating maleic anhydride and one of said cyclic adducts in the presence of a free radical precursor at a reaction temperature which is a temperature of endo-exo isomerization of the adduct.

2. A process for the preparation of terpolymers of maleic anhydride and the exo and endo cyclic adducts of maleic anhydride and a cyclic conjugated diene, said diene selected from the group consisting of cyclopentadiene and methylcyclopentadiene, which comprises heating maleic anhydride and either cyclic adduct in the presence of a free radical precursor, at a reaction temperature which is a temperature of endo-exo isomerization of the adduct.

3. The process of claim 2 where said adduct is the endo isomer.

4. The process of claim 2 where said adduct is the exo isomer.

5. The process of claim 2 where said adduct is a mixture of the endo and exo isomers.

6. The process of claim 2 where said free radical precursor is a peroxygen compound.

7. The process of claim 6 where said peroxygen compound is selected from the group consisting of peroxides, peresters and hydroperoxides.

8. The process of claim 2 where the reaction is carried out in the presence of an inert solvent.

9. The process of claim 2 where said free radical precursor is added to the mixture of maleic anhydride and the cyclic adduct at the reaction temperature.

10. The process of claim 2 where said reaction temperature is between 170° and 300° C.

11. The process of claim 2 where said reaction temperature is above 200° C.

* * * * *